(12) United States Patent
Jang et al.

(10) Patent No.: US 12,565,132 B2
(45) Date of Patent: Mar. 3, 2026

(54) TABLE DEVICE FOR A VEHICLE

(71) Applicants: HYUNDAI MOTOR COMPANY, Seoul (KR); KIA CORPORATION, Seoul (KR); NIFCO KOREA INC., Asan-si (KR); KBI DONGKOOK IND. CO., LTD., Seoul (KR)

(72) Inventors: Yeong Jae Jang, Seoul (KR); Hye Kyung Kim, Suwon-si (KR); Won Sang Cho, Asan-si (KR); Ji Hye Song, Hwaseong-si (KR); Chang Bok Park, Hwaseong-si (KR); Dong Il Son, Asan-si (KR)

(73) Assignees: HYUNDAI MOTOR COMPANY, Seoul (KR); KIA CORPORATION, Seoul (KR); NIFCO KOREA INC., Asan-si (KR); KBI DONGKOOK IND. CO., LTD., Seoul (KR)

( * ) Notice: Subject to any disclaimer, the term of this patent is extended or adjusted under 35 U.S.C. 154(b) by 375 days.

(21) Appl. No.: 18/386,920

(22) Filed: Nov. 3, 2023

(65) Prior Publication Data

US 2024/0359610 A1 Oct. 31, 2024

(30) Foreign Application Priority Data

Apr. 27, 2023 (KR) ........................ 10-2023-0055265

(51) Int. Cl.
*B60N 3/00* (2006.01)
(52) U.S. Cl.
CPC ................................... *B60N 3/001* (2013.01)

(58) Field of Classification Search
CPC .......... B60N 3/00; B60N 3/001; B60N 3/002; B60N 2/42; B60N 2/433; B60N 2/43
USPC ........................................................ 296/1.07
See application file for complete search history.

(56) References Cited

U.S. PATENT DOCUMENTS

| | | | | |
|---|---|---|---|---|
| 2,275,060 A * | 3/1942 | Griffin | ................... | B60N 3/002 312/246 |
| 4,792,174 A * | 12/1988 | Shioda | ................... | B60N 3/002 108/45 |
| 11,590,875 B2 * | 2/2023 | Park | ....................... | B60N 3/002 |
| 11,731,548 B2 * | 8/2023 | Park | ......................... | B60R 7/06 296/37.12 |
| 11,850,979 B2 * | 12/2023 | Thomas | ................. | B60N 2/427 |
| 2021/0300226 A1 * | 9/2021 | Burggraf | ................ | B60N 3/001 |
| 2025/0010781 A1 * | 1/2025 | Kock | ..................... | B60N 3/001 |

FOREIGN PATENT DOCUMENTS

KR 20220146850 A 11/2022

* cited by examiner

*Primary Examiner* — Steven O Douglas
(74) *Attorney, Agent, or Firm* — Lempia Summerfield Katz LLC

(57) ABSTRACT

A table device for a vehicle includes: a table mounted on a fixing unit and provided to slide forward; a first stopper mounted on the fixing unit and configured to move up and down and to restrict a movement of the table; and a second stopper rotatably mounted on the fixing unit. The second stopper can latch to and be positioned on the first stopper to restrict upward and downward movements of the first stopper. The second stopper is configured to selectively rotate by a forward acceleration or force generated in an event of a vehicle collision to be released from the latching of the first stopper.

11 Claims, 3 Drawing Sheets

TABLE DEVICE FOR A VEHICLE

CROSS-REFERENCE TO RELATED APPLICATION

This application claims under 35 U.S.C. § 119 (a) the benefit of priority to Korean Patent Application No. 10-2023-0055265 filed on Apr. 27, 2023, the entire contents of which are incorporated herein by reference.

BACKGROUND

(a) Technical Field

The present disclosure relates to a table device for a vehicle, and more specifically, to a table device for a vehicle capable of avoiding contact between a passenger and a table by unlocking the table in the event of a vehicle collision.

(b) Background Art

In general, vehicles are equipped with various convenience devices to enhance the convenience of occupants inside the vehicle. These convenience devices may include, for example, a table installed between a driver's seat and a front passenger's seat or on a panel in front of the front passenger's seat.

The table may be provided in a structure that may be folded between the driver's seat and the front passenger's seat. The table may also be provided in a structure that may be inserted into and drawn out from the front of the front passenger's seat. The table makes it possible to eat food or do simple tasks in a vehicle.

However, there is a safety concern related to table devices installed in vehicles. Typically, these table device are disposed upright in a horizontal direction with respect to a seated passenger due to their structural characteristics. When a collision or accident suddenly occurs in a state in which the passenger is using the table device, the impact of the collision can cause the passenger to collide with the fixed table device, resulting in a secondary impact. Thus, the secondary impact poses a problem incapable of preventing accidents.

Therefore, in such a situation, it is important to prevent the secondary impact applicable to the passenger due to the table device by allowing the table device to selectively avoid contact with the passenger.

SUMMARY

The present disclosure is directed to providing a table device for a vehicle capable of avoiding contact between a passenger and a table through a forward movement of the table. For example, the table device has a structure having a plurality of stoppers for fixing the table and unlocking the table by the plurality of connected stoppers that are sequentially operated in the event of a vehicle collision.

A table device for a vehicle according to the present disclosure includes a table mounted on a fixing unit and provided to slide forward. The table device also includes a first stopper mounted on the fixing unit and configured to move up and down and to restrict a movement of the table. The table device also includes a second stopper rotatably mounted on the fixing unit. The second stopper is configured to latch to and be positioned on the first stopper to restrict upward and downward movements of the first stopper. The second stopper is also configured to selectively rotate by a forward acceleration or force generated in the event of a vehicle collision to be released from the latching of the first stopper.

A position of the table may be fixed by the first stopper. As the first stopper is switched in a state of moving up and down, the table may be configured to selectively slide.

In addition, the table may include a sliding unit having a guide slot forming a sliding path for a protrusion member to slide along. The protrusion member may be provided on the fixing unit. The table may also include a folding unit foldably mounted on the slide moving unit.

The sliding unit may include a latching member formed stepwise so that the first stopper is latched and positioned.

In addition, the latching member may be inclined upward in a direction in which the sliding unit slides.

In addition, the first stopper may be disposed in contact with the latching member and formed in a shape corresponding to the latching member.

The first stopper may include a body member mounted on a mounting guide provided on the fixing unit. The body member may be configured to move up and down. The first stopper may also include an elastic member configured to elastically support the body member on the mounting guide.

In addition, the second stopper may include a rotating part axially coupled to the fixing unit and connected to a driving member. The second stopper may include a latching part protruding from one side of the rotating part. The latching part may be configured to be latched to and positioned in a latching groove provided in the first stopper.

The second stopper may further include a rotation guide member positioned on a rotation guide provided on the fixing unit and configured to guide a rotation path of the rotating part.

In addition, the driving member may provide a driving force to the rotating part so that the latching part is fixed to the latching groove.

The driving member may be electrically connected to an airbag control unit (ACU) mounted in a vehicle and configured to selectively block a driving force provided to the rotating part or to provide the driving force so that the rotating part rotates in a collision direction after receiving a collision occurrence signal.

According to the present disclosure, it is possible to avoid the contact between the passenger and the table through the forward movement of the table. For example, the table device has a structure having the plurality of stoppers for fixing the table and unlocking the table by the plurality of connected stoppers that are sequentially operated in the event of a vehicle collision.

Therefore, according to the present disclosure, it is possible to use the table stably and the table may selectively undergo the forward movement when the collision or accident suddenly occurs. The secondary impact with the table may be prevented during an accident.

It should be understood that the terms "automotive," "vehicle," "vehicular," or other similar terms as used herein are inclusive of motor vehicles in general. Such motor vehicles may include sports utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, e.g., a vehicle that is both gasoline-powered and electric-powered.

The above and other features of the disclosure are discussed below.

BRIEF DESCRIPTION OF THE DRAWINGS

The above and other features of the present disclosure are described in detail with reference to certain examples thereof illustrated in the accompanying drawings, which are given herein below by way of illustration only, and thus are not limitative of the present disclosure, and wherein.

Figure 1:
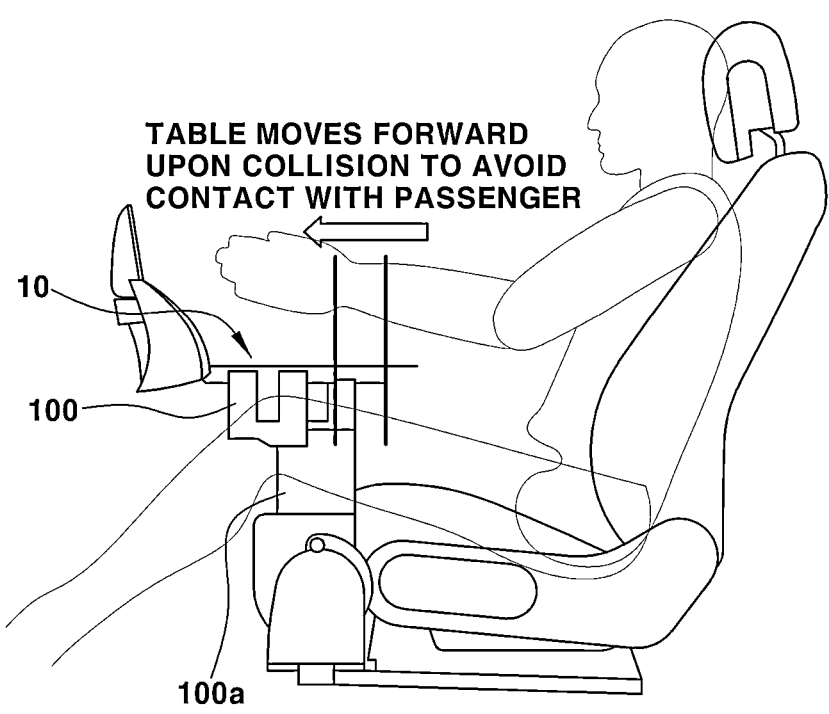
FIG. 1 is a view illustrating a sliding movement of a table of a table device for a vehicle according to an embodiment of the present disclosure.

It should be understood that the appended drawings are not necessarily drawn to scale, and thus present a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter, embodiments according to the present disclosure are described in detail with reference to the accompanying drawings.

Advantages and features of the present disclosure and methods for achieving them should become clear with reference to the embodiments described below in detail in conjunction with the accompanying drawings.

However, the present disclosure is not limited to the embodiments disclosed below but will be implemented in various different forms. These embodiments are merely provided to make the disclosure of the technical concepts complete. Furthermore, these embodiments are provided to fully inform those having ordinary skill in the art to which the present disclosure pertains and aid in providing a complete understanding of the scope of the present disclosure. The present disclosure is only defined by the scope of the appended claims.

In addition, in the description of the present disclosure, when it is determined that related known technologies may obscure the gist of the present disclosure, a detailed description thereof is omitted.

The terms first, second, and/or the like in the present disclosure may be used to describe various components, but the components are not limited by these terms. These terms may be used only for the purpose of distinguishing one component from another component. For example, a first component may be referred to as a second element, and similarly, the second component may also be referred to as the first component without departing from the scope of the present disclosure.

When a component, device, element, or the like of the present disclosure is described as having a purpose or performing an operation, function, or the like, the component, device, or element should be considered herein as being "configured to" meet that purpose or perform that operation or function.

When a component is referred to as being "connected" to or "in contact" with another component, it should be understood that it may be directly connected to or in contact with the other component, but other components may exist therebetween. On the other hand, when a component is referred to as being "directly connected" to or "directly in contact" with another component, it should be understood that there is no other component therebetween.

Figure 2:
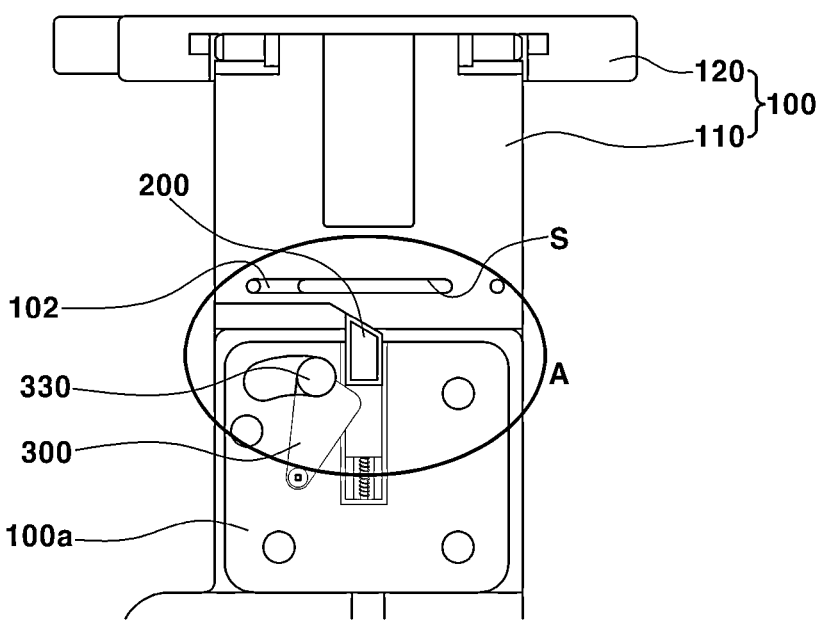
FIG. 2 is a view illustrating a structure of the table device for a vehicle according to the embodiment of the present disclosure.

FIG. 1 is a view illustrating a sliding movement of a table for a table device for a vehicle according to an embodiment of the present disclosure. FIG. 2 is a view illustrating a structure of the table device for a vehicle according to the embodiment of the present disclosure.

Figure 3:
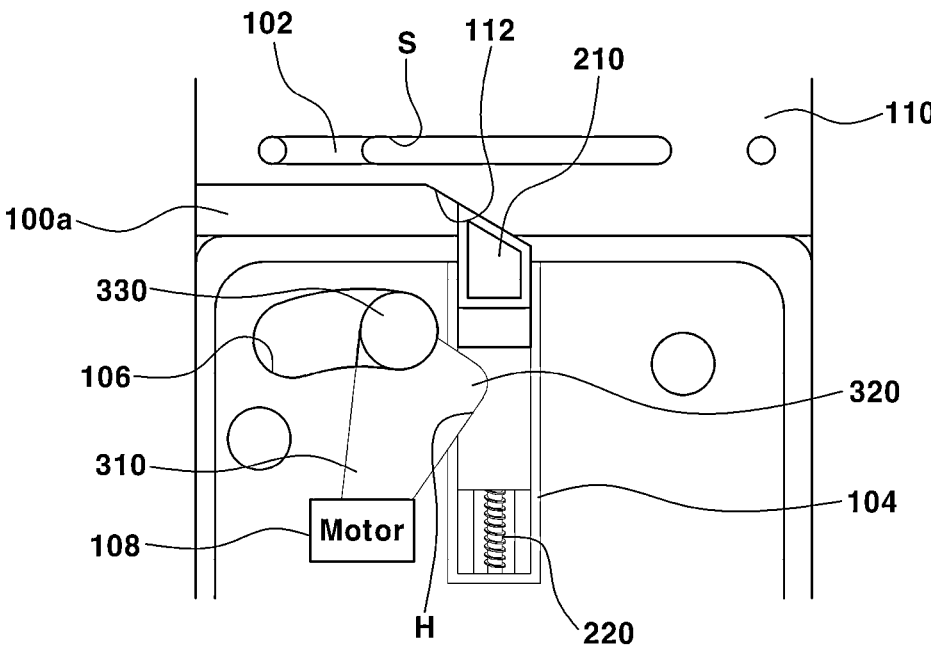
FIG. 3 is an enlarged view of region A in FIG. 2 illustrating a coupling relationship of the table device for a vehicle according to the embodiment of the present disclosure.
Figure 4:
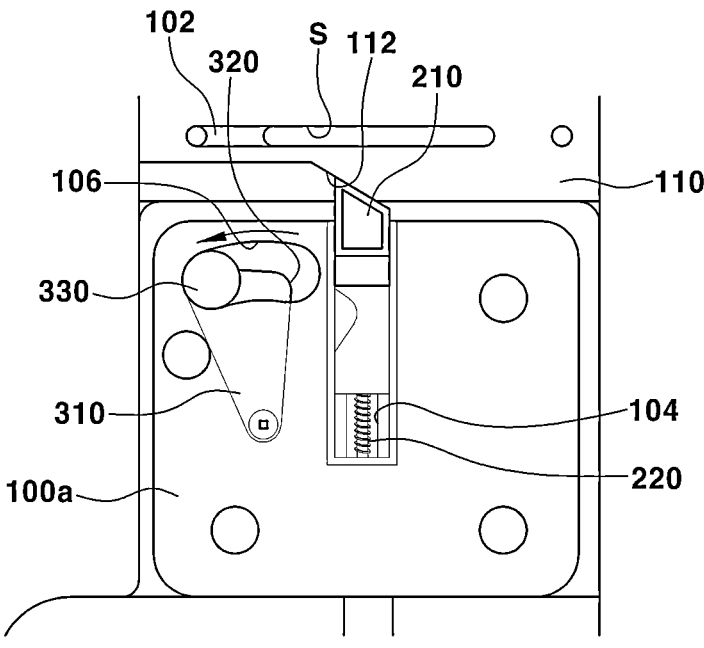
FIGS. 4-6 are views sequentially illustrating an operation sequence of the table device for a vehicle in the event of a vehicle collision according to the embodiment of the present disclosure.
Figure 5:
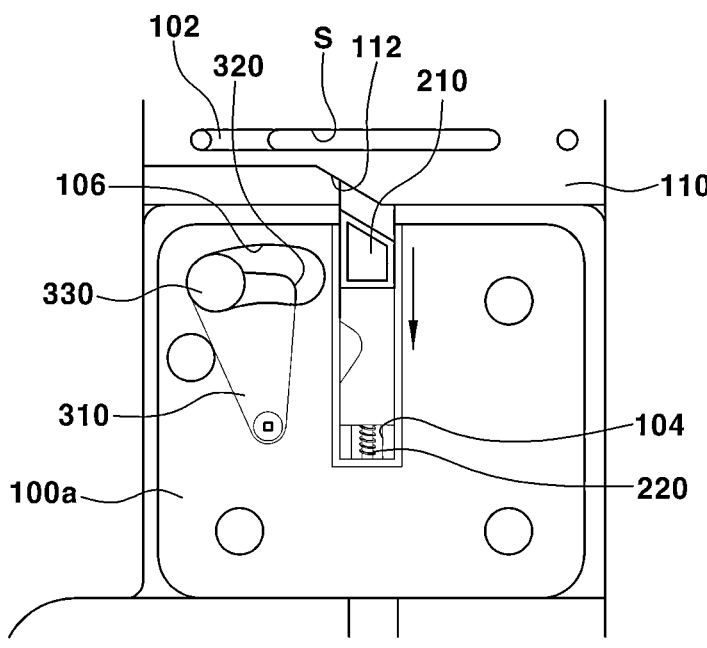
Figure 6:
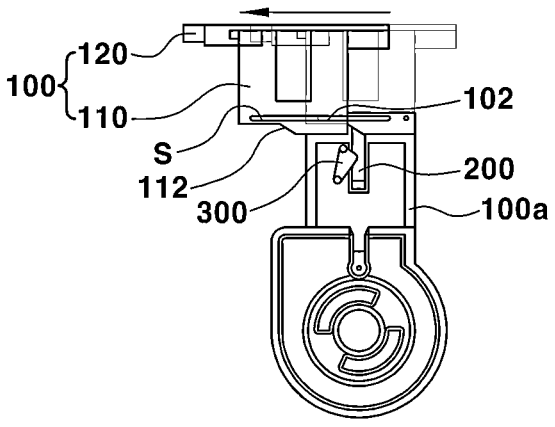

In addition, FIG. 3 is an enlarged view of region A in FIG. 2 illustrating a coupling relationship of the table device for a vehicle according to the embodiment of the present disclosure. FIGS. 4-6 are views sequentially illustrating an operation sequence of the table device for a vehicle in the event of a vehicle collision according to the embodiment of the present disclosure.

Typically, a table device applied to a vehicle may be installed at a rear of a first-row seat for second-row passengers. Alternatively, the table device may be installed on a second-row seat to allow the passengers to use the table device by placing a cup, a book, a laptop, and the like thereon, thereby providing convenience to the passengers seated on the second-row seat.

However, since contact with the passenger may occur in the event of a frontal collision of a vehicle when a passenger seated on the first-row seat uses the table device, there is a concern about the occurrence of injuries due to the vehicle collision and the occurrence of secondary injuries due to the contact with the table device. Therefore, it is difficult to apply the table device to the front passenger's seat.

Therefore, as illustrated in FIG. 1, when a table device 10 is configured to selectively slide in the event of a vehicle collision, it is possible to structurally prevent a passenger from coming in contact with the table device 10. Thus, the table device 10 may also be applied to the front passenger's seat in the first row.

To this end, the table device 10 for a vehicle according to the embodiment includes a table 100, a first stopper 200, and a second stopper 300.

The table 100 is formed to have a predetermined size to be used by placing a cup, a book, a laptop, and the like. The table 100 is mounted on a fixing unit 100*a* fixedly installed on a center console or the like of a vehicle to slide forward.

As illustrated in FIG. 2, a position of the table 100 is fixed by the first stopper 200. As the first stopper 200 is switched to a state of moving up and down, i.e., as the table 100 is released from the latching of the first stopper 200, the table 100 is configured to selectively slide forward.

The table 100 may include a sliding unit 110 and a folding unit 120.

The sliding unit 110 includes a guide slot S for forming a sliding path for a protrusion member 102. The protrusion member 102 protrudes from one side of a fixing unit 100*a*.

Therefore, when sliding forward in the event of a vehicle collision, the sliding unit 110 can smoothly and securely (e.g., stably) slide in a state in which the protrusion member 102 is positioned inside the guide slot S.

The folding unit 120 may have a foldable structure and may be mounted on the sliding unit 110. The folding unit 120 is formed in a structure that rotates to be in contact with the sliding unit 110 to be stored when not used and is selectively unfolded when used.

As illustrated in FIG. 3, the sliding unit 110 includes a latching member 112 so that a position is fixed by the first stopper 200.

In other words, the latching member 112 is formed stepwise so that the first stopper 200 is latched and positioned. The latching member 112 may be inclined upward in a direction in which the sliding unit 110 slides, i.e., moves forward.

Likewise, the first stopper 200 has one protruding end disposed in contact with the latching member 112, has a shape corresponding to the latching member 112, and is formed to be inclined.

Therefore, as the first stopper 200 is fixed in a state in which one end protrudes, it is possible to structurally block the forward sliding movement of the latching member 112.

The first stopper 200 includes a body member 210 and an elastic member 220.

The body member 210 is mounted on a mounting guide 104 provided on the fixing unit 100a and is configured to move up and down. One end of the body member 210 is formed in an inclined shape corresponding to the latching member 112 as described above and the other end is inserted onto the mounting guide 104 and provided to move up and down.

In addition, the elastic member 220 may elastically support the body member 210 on the mounting guide 104. Therefore, the elastic member 220 applies a force to the body member 210 in a direction in which the body member 210 moves up and presses the inclined surface of the latching member so that the sliding unit 110 is fixed.

The body member 210 may be provided with a latching groove H. The second stopper 300 may be inserted into the latching groove H to structurally block the downward movement of the first stopper 200.

To this end, the second stopper 300 includes a rotating part 310 and a latching part 320. The rotating part 310 is axially coupled to the fixing unit 100a and connected to a driving member (e.g., motor, actuator, or the like) 108. The latching part 320 protrudes from one side of the rotating part 310 and is configured to be latched to and positioned in the latching groove H.

In other words, in a state in which a rotating shaft (not illustrated) of the rotating part 310, which is connected to the driving member 108, is coupled to the fixing unit 100a, the latching part 320 may be latched to and positioned in the latching groove H to block the downward movement of the first stopper 200. When a vehicle collision occurs, the rotating part 310 may rotate counterclockwise through the axial rotation so that the latching part 320 is separated from the latching groove H. Thus the first stopper 200 may move up and down so that the latching member 112 for sliding of the table 100 may be released from the latching of the first stopper 200.

More particularly, when the latching part 320 is separated from the latching groove H upon sliding of the table 100, the first stopper 200 may move up and down. Thus, in this state, when the latching member 112 presses the protruding inclined surface of the first stopper 200 through the inclined surface in a moving direction, the elastic member 220 may be compressed to allow the first stopper 200 to move downward on the mounting guide 104 so that the table 100 may slide freely.

The second stopper 300 may further include a rotation guide member 330 for forming a separation path when the latching part 320 is separated from the latching groove H. The rotation guide member 330 may be positioned inside a rotation guide 106 having an arc shape provided on the fixing unit 100a to guide a rotation path of the rotating part 310 along the rotation guide 106.

In addition, when the rotating part 310 rotates along the rotation guide 106, it is desirable to perform control of selectively blocking a driving force of the driving member 108 from being transmitted through a separate controller (not illustrated).

In other words, the driving member 108 may be formed of a motor (e.g., actuator, or the like) and may provide a driving force to the rotating part 310. More specifically, the driving member 108 may provide the driving force so that the rotating shaft of the rotating part 310 is fixed in a state in which the latching part 320 is latched to and positioned in the latching groove H. Additionally, in the event of a vehicle collision, by controlling the driving member 108 not to transmit the driving force, the second stopper 300 may rotate counterclockwise.

More specifically, the driving member 108 may be electrically connected to an airbag control unit (ACU) mounted in a vehicle to selectively block the driving force provided to the rotating shaft of the rotating part 310 or provide the driving force so that the rotating part 310 rotates in a collision direction after receiving a collision occurrence signal. In other words, if the collision is a front collision, the rotating part 310 may rotate toward the front of the vehicle. Therefore, the table 100 may eventually slide by sequentially releasing the latching of the second stopper 300 and the first stopper 200.

Referring to FIGS. 4-6, based on the configuration of the above-described table device for a vehicle according to the embodiment, the operation sequence is sequentially described as follows.

Assuming that the table device 10 for a vehicle is being used in the front passenger's seat in the first row, when a vehicle collision occurs, the second stopper 300 rotates due to a forward force (e.g., acceleration) (see FIG. 4).

When an airbag is deployed by the occurrence of the collision and the collision occurrence signal is transmitted from the ACU of a vehicle, the controller (not illustrated) controls the driving member 108 so that the second stopper 300 may rotate forward by a force generated upon the collision. The controller also allows the driving member 108 to selectively block the driving force provided to the rotating part 310.

As described above, when the second stopper 300 rotates, the latching of the latching part 320 may be released from the latching groove H. Thus, the first stopper 200 may transition into a state of freely moving up and down on the mounting guide 104.

In this state, when the sliding unit 110 slides forward, the first stopper 200 is pressed by the latching member 112 along the inclined surface to move down on the mounting guide 104 (see FIG. 5). As a result, as illustrated in FIG. 6, the sliding unit 110 slides forward along the slot S together with the folding unit 120.

Therefore, by maintaining the table 100 in a stable fixed state using the latching operations of the first stopper 200 and the second stopper 300 when traveling, and then allowing the table 100 to slide forward by a consecutive latching release operation of the first stopper 200 and the second stopper 300 in the event of a collision, it is possible to prevent the secondary impact of the passenger caused by the collision with the table 100. As a result, a secondary impact with the table is prevented, thereby enhancing safety and preventing accidents.

According to the present disclosure, it is possible to avoid the contact between the passenger and the table through the forward movement of the table by applying the structure having the plurality of stoppers for fixing the table and unlocking the table by the plurality of connected stoppers that are sequentially operated in the event of a vehicle collision.

Therefore, according to the present disclosure, it is possible to stable use the table and selectively perform the forward movement of the table when the collision accident suddenly occurs. As a result, the secondary impact caused by the table is prevented, thereby preventing accidents and enhancing safety.

The present disclosure has been described above with reference to the embodiment(s) shown in the drawings. However, it should be understood that this is only illustrative, and various modifications can be made from the present disclosure by those having ordinary skill in the art. All or some of the above-described embodiment(s) may also be configured in selective combination thereof. Therefore, the true technical scope of the present disclosure should be determined by the technical spirit of the appended claims.

What is claimed is:

1. A table device for a vehicle, the table device comprising:
   a table mounted on a fixing unit and provided to slide forward;
   a first stopper mounted on the fixing unit and configured to move up and down and to restrict a movement of the table; and
   a second stopper rotatably mounted on the fixing unit, the second stopper configured to latch to and be positioned on the first stopper so as to restrict upward and downward movements of the first stopper, the second stopper also configured to selectively rotate by a forward acceleration generated in an event of a vehicle collision to be released from the latching of the first stopper.

2. The table device of claim 1, wherein a position of the table is fixed by the first stopper, and wherein, as the first stopper is switched in a state of moving up and down, the table is configured to selectively slide.

3. The table device of claim 1, wherein the table comprises:
   a protrusion member provided on the fixing unit;
   a sliding unit including a guide slot forming a sliding path for the protrusion member to slide along; and
   a folding unit foldably mounted on the sliding unit.

4. The table device of claim 3, wherein the sliding unit includes a latching member formed stepwise so that the first stopper is latched and positioned.

5. The table device of claim 4, wherein the latching member is inclined upward in a direction in which the sliding unit slides.

6. The table device of claim 5, the first stopper is disposed in contact with the latching member and formed in a shape corresponding to the latching member.

7. The table device of claim 1, wherein the first stopper includes:
   a body member mounted on a mounting guide provided on the fixing unit, the body member configured to move up and down; and
   an elastic member configured to elastically support the body member on the mounting guide.

8. The table device of claim 1, wherein the second stopper includes:
   a rotating part axially coupled to the fixing unit and connected to a driving member; and
   a latching part protruding from one side of the rotating part, the latching part configured to be latched to and positioned in a latching groove provided in the first stopper.

9. The table device of claim 8, wherein the second stopper further includes a rotation guide member positioned on a rotation guide provided on the fixing unit and configured to guide a rotation path of the rotating part.

10. The table device of claim 8, wherein the driving member provides a driving force to the rotating part so that the latching part is fixed to the latching groove.

11. The table device of claim 8, wherein the driving member is electrically connected to an airbag control unit (ACU) mounted in the vehicle and configured to selectively block a driving force provided to the rotating part or to provide the driving force so that the rotating part rotates in a collision direction after receiving a collision occurrence signal.

* * * * *